(12) United States Patent
Kortge et al.

(10) Patent No.: US 8,213,967 B2
(45) Date of Patent: Jul. 3, 2012

(54) PREVENTING REPLAY-TYPE ATTACKS ON A VEHICLE COMMUNICATIONS SYSTEM

(75) Inventors: James M. Kortge, Ferndale, MI (US); Ansaf I. Alrabady, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1089 days.

(21) Appl. No.: 11/968,068

(22) Filed: Dec. 31, 2007

(65) Prior Publication Data

US 2009/0170539 A1    Jul. 2, 2009

(51) Int. Cl.
*H04W 4/00* (2009.01)

(52) U.S. Cl. .............. 455/466; 455/412.1; 455/412.2; 455/414.3; 455/569.2; 455/575.9; 380/279; 380/281; 380/283; 380/285

(58) Field of Classification Search .......... 455/410, 455/569.1–570, 575.9
See application file for complete search history.

(56) References Cited

U.S. PATENT DOCUMENTS

| | | | |
|---|---|---|---|
| 6,367,014 B1 * | 4/2002 | Proust et al. ................ | 713/182 |
| 2003/0096641 A1 * | 5/2003 | Odinak ...................... | 455/569 |
| 2004/0077362 A1 * | 4/2004 | Chinomi et al. ............ | 455/456.5 |
| 2004/0082321 A1 * | 4/2004 | Kontianinen ............... | 455/415 |
| 2004/0117498 A1 * | 6/2004 | Hashimoto et al. ......... | 709/230 |
| 2006/0268916 A1 * | 11/2006 | Sarkar ....................... | 370/431 |

* cited by examiner

*Primary Examiner* — Dai A Phuong
(74) *Attorney, Agent, or Firm* — Anthony L. Simon; Reising Ethington P.C.

(57) ABSTRACT

A method and system for preventing replay-type attacks on a vehicle communications system that sends short message service (SMS) messages between a call center and a fleet of vehicles. The method uses separate sequence counters maintained at the call center and at each of the vehicles in the fleet to help prevent or at least minimize the effects of unauthorized third party interference; such as replay-type attacks. Each wireless message is embedded with a sequence counter that is provided by the sender and is compared by the recipient with a separate sequence counter for purposes of validation. Some optional features that can be used in conjunction with the sequence counters include a tolerance window feature, a consecutive message feature, and a proximity feature, to name but a few.

2 Claims, 3 Drawing Sheets

PREVENTING REPLAY-TYPE ATTACKS ON A VEHICLE COMMUNICATIONS SYSTEM

TECHNICAL FIELD

The present invention generally relates to methods for communicating with a vehicle through a vehicle communications system and, more particularly, to methods that use sequence counters to prevent replay-type attacks on a vehicle communications system that communicates with short message service (SMS) messages.

BACKGROUND OF THE INVENTION

Numerous types of wireless communication devices are used throughout the world each day, including devices such as cellular phones, pagers, personal digital assistants (PDAs), and vehicle communication devices. Many of these devices use one or more types of communication channels, including voice and data channels, to provide a variety of services over wireless networks.

SMS messages transmit short text messages between different wireless communications devices, most commonly mobile phones. SMS messaging has a number of desirable attributes that have made it quite a popular form of communicating, including attributes pertaining to its speed and its privacy. Notwithstanding these positive characteristics, there are still instances where users of SMS messages can be subjected to nefarious third party actions, such as replay-type attacks. In a replay-type attack, an unauthorized third party intercepts a wireless message and then retransmits the message to the intended recipient at a later time pretending to be the original sender.

SUMMARY OF THE INVENTION

According to one aspect of the invention, there is provided a method of preventing replay-type attacks on a vehicle communications system. The method generally comprises the steps of: (a) maintaining a central data structure at a call center, wherein the central data structure includes a plurality of sequence counters associated with a fleet of vehicles, and wherein the plurality of sequence counters includes a first sequence counter that is associated with a specific vehicle and is incremented each time a new message is sent to or received from the vehicle; (b) maintaining a vehicle data structure at the vehicle, wherein the vehicle data structure includes a second sequence counter that is also associated with the vehicle and is incremented each time a new message is sent to or received from the call center; (c) sending a wireless message between the call center and the vehicle, wherein the wireless message includes the first sequence counter or the second sequence counter; and (d) comparing the first sequence counter to the second sequence counter, wherein the comparison is used to prevent replay-type attacks by identifying wireless messages that were previously sent between the call center and the vehicle.

According to another aspect of the invention, there is provided a method of preventing replay-type attacks on a vehicle communications system. This method generally comprises the steps of: (a) constructing a short message service (SMS) message having a payload section; (b) inserting a first sequence counter into the payload section of the SMS message, wherein the first sequence counter is associated with a specific vehicle and is incremented each time a new message is sent to the vehicle; (c) sending the SMS message to the vehicle over a wireless carrier system; (d) extracting the first sequence counter from the payload section of the SMS message; and (e) evaluating the first sequence counter with a second sequence counter stored at the vehicle, wherein the evaluation is used to prevent replay-type attacks by providing additional security features beyond those inherent to the SMS protocol.

According to yet another aspect of the invention, there is provided a system for preventing replay-type attacks that generally comprises a fleet of vehicles, a call center, and a wireless carrier system. Each vehicle in the fleet has a telematics unit and a vehicle data structure with a sequence counter stored thereon. The call center has a central data structure with a plurality of sequence counters stored thereon, with each of the plurality of sequence counters being associated with an individual vehicle in the fleet and being maintained independently of the other sequence counters. The wireless carrier system connects the call center to the telematics unit of each of the vehicles in the fleet, wherein wireless messages sent between the call center and the vehicles of the fleet are at least in part authenticated by comparing a sequence counter from the vehicle data structure with a sequence counter from the central data structure.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED

The method described herein can be used by a vehicle to prevent replay-type attacks on a vehicle communications system that communicates with SMS messages. SMS messaging is generally premised on a one-way transmission architecture (i.e. does not use response messages) and lacks some of the security features found in other forms of data communication, such as messaging over a TCP/IP network which is based on a two-way architecture. Therefore, it can be desirable to provide additional security features above and beyond those inherent to the SMS protocol. For example, if a telematics-equipped vehicle is designed to receive SMS messages from an affiliated call center, then it can be desirable to ensure that an incoming SMS message is in fact from the call center and not some unauthorized third party. The method described below uses sequence counters and other techniques to help prevent or at least minimize the effects of unauthorized third party interference; most notably, it is designed to protect against replay-type attacks.

Vehicle Communications System—

Figure 1:
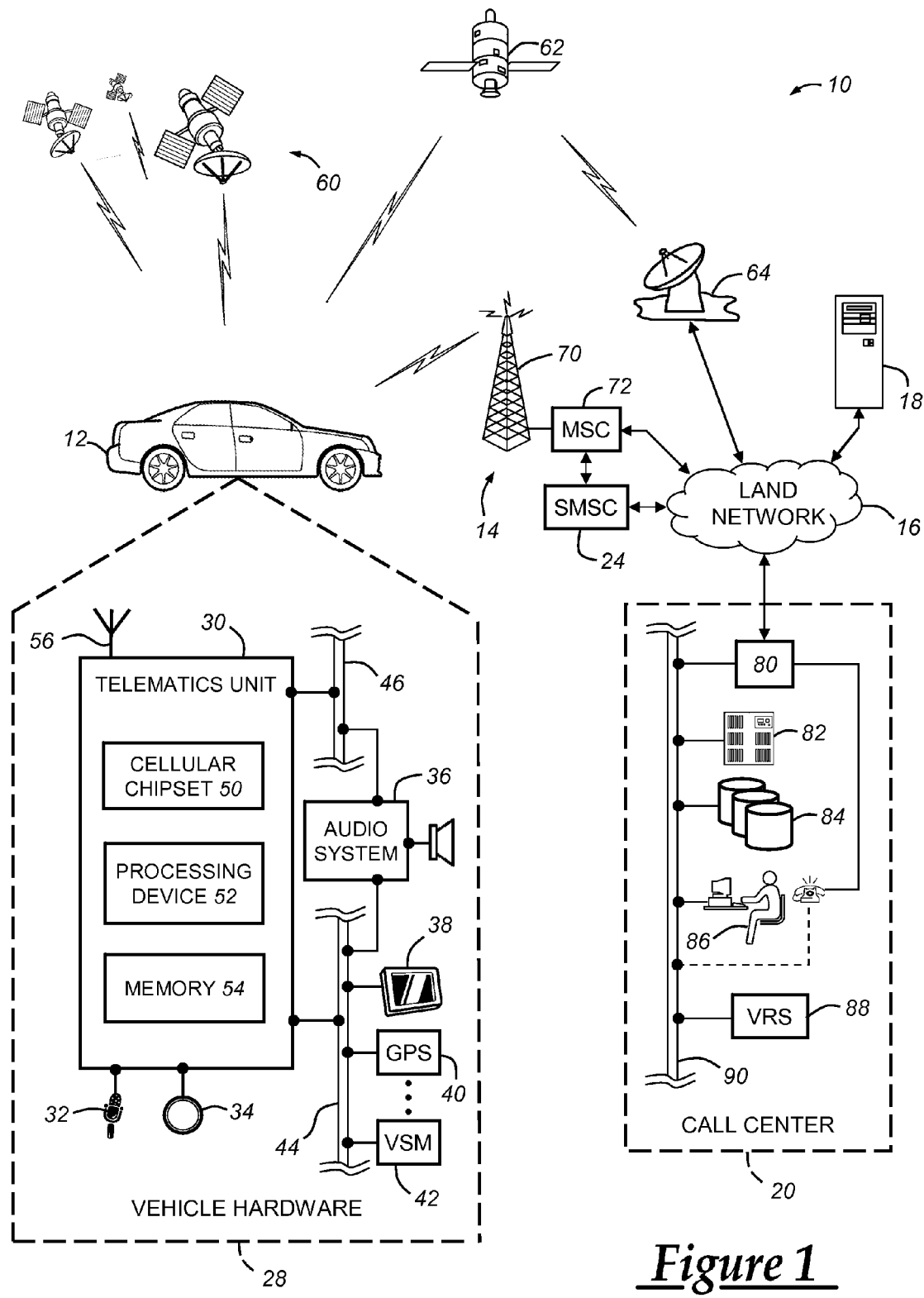
FIG. 1 is a block diagram depicting an exemplary embodiment of a vehicle communications system that is capable of utilizing the present method.

With reference to FIG. 1, there is shown an exemplary operating environment that comprises a vehicle communications system 10 and that can be used to implement the method disclosed herein. Vehicle communications system 10 generally includes a telematics-equipped vehicle 12, one or more wireless carrier systems 14, a land communications network 16, a computer 18, a call center 20, and a short message service center (SMSC) 24. It should be understood that the disclosed method can be used with any number of different systems and is not specifically limited to the operating environment shown here. Also, many aspects related to the architecture, construction, setup, and operation of vehicle communication system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is a device that enables wireless voice and/or data communication over wireless carrier system 14 and/or a separate wireless network so that the vehicle can communicate with call center 20, other telematics-equipped vehicles, or some other entity or device. According to one embodiment, the telematics unit uses radio transmissions to establish a communications channel (a voice channel and/or a data channel) with wireless carrier system 14 so that voice and/or data transmissions can be sent and received over the communications channel. By providing both voice and data communication, telematics unit 30 enables the vehicle to offer a number of different services including those related to messaging, navigation, telephony, emergency assistance, diagnostics, infotainment, etc. Data can be sent over a data connection, such as via a packet switching connection, or via a voice channel using techniques already known in the art. For combined services that involve both voice communication and data communication, the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet switching data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and from the vehicle. Such services can include: remote control of certain vehicle features through the use of VSMs 42; turn-by-turn directions and other navigation-related services provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the exemplary telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize communications bus 44 to exchange data and commands with the telematics unit.

GPS module 40 receives signals from a constellation of GPS satellites 60. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests and perform other functions. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks. According to one embodiment, the ECM is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel, a pop-up visual display, or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Wireless carrier system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14. As mentioned above, it is also possible for vehicle 12 to communicate with one or more wireless networks through wireless protocols such as any of the IEEE 802.11 protocols, WiMAX, or Bluetooth.

Land network 16 may be a conventional land-based telecommunications network that is connected to one or more landline telephones and can connect wireless carrier system 14 to call center 20. For example, land network 16 may include a public switched telephone network (PSTN) such as that used to provide hardwired telephony, packet switching data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or for setting up or configuring subscriber preferences; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, sequence counters, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Short message service center (SMSC) 24 is preferably in communication with wireless carrier system 14 and/or land network 16 and is involved in the communication of SMS messages. SMSC 24 can operate according to a store-and-forward principal; that is, when a first user sends an SMS message that is intended for a second user, the SMS message gets stored at the SMSC until the second user is available to receive it. In other embodiments, the SMSC employs a store-and-forget approach where it only attempts to pass the SMS message along one time. These types of approaches enable users to send and receive SMS messages at any time, even if they are currently on a voice call. It should of course be appreciated that the exemplary representation of SMSC 24 is but one example of a suitable arrangement, as the SMSC could instead be provided according to some other configuration known in the art. For instance, SMSC 24 could be integrated within wireless carrier system 14 and/or land network 16, instead of being schematically shown as a separate stand-alone component. Also, it is to be understood that multiple SMSCs may be utilized.

Method of Preventing Replay-type Attacks—

Figure 2:
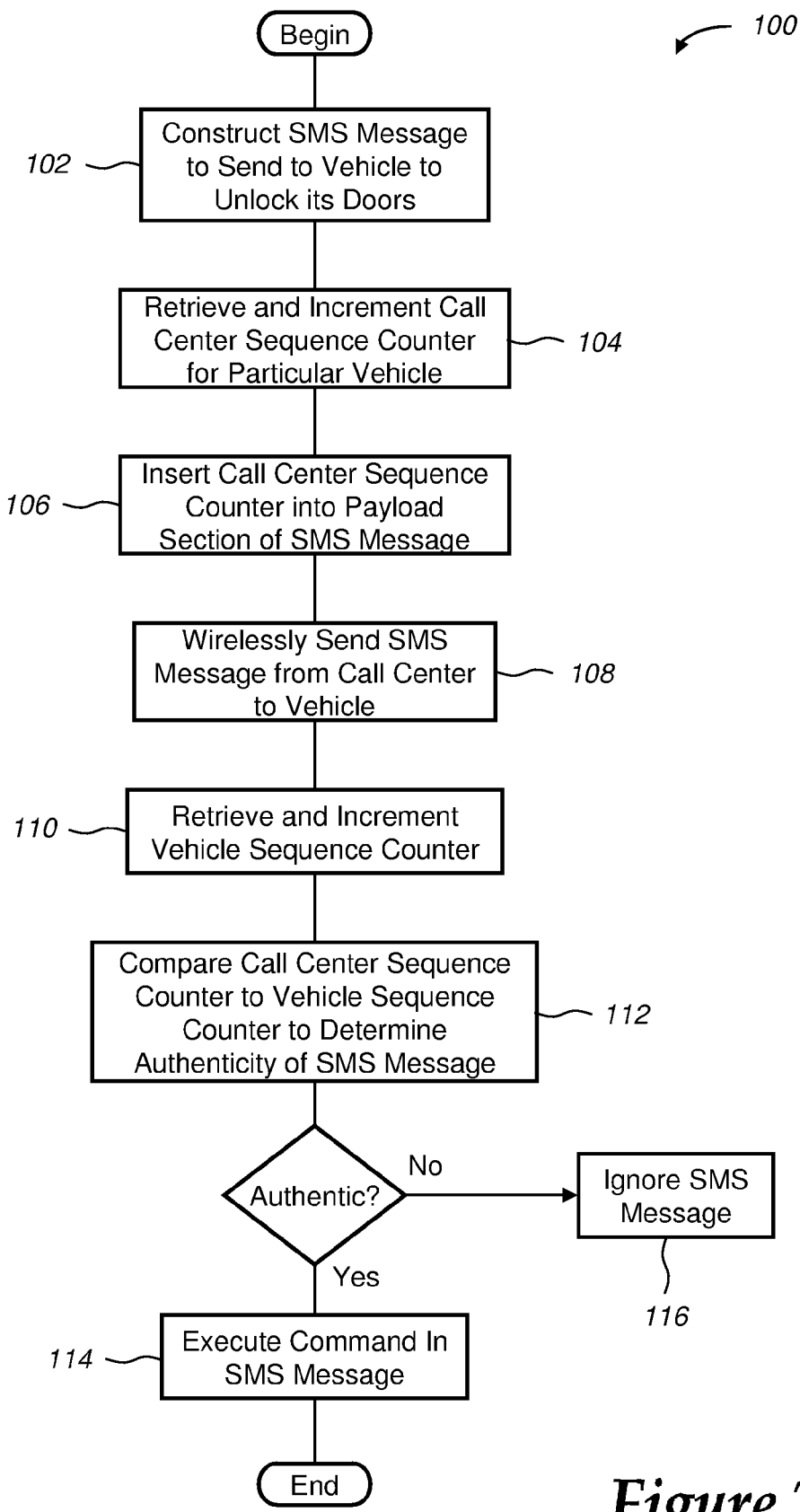
FIG. 2 is a flow chart depicting some of the steps of an embodiment of the present method.

Turning now to FIG. 2, there is shown some of the steps of an embodiment 100 of a method which enhances the security of wireless messages, particularly SMS messages, by preventing replay-type attacks on a vehicle communications system. Although the exemplary embodiment shown in FIG. 2 is specifically directed to a mobile-terminated SMS message that originates at call center 20 and terminates at telematics-equipped vehicle 12, it should be appreciated that the present method could also be used with other communications such ones that are mobile-originated, involve messaging types other than SMS, originate at the vehicle and terminate at the call center, are vehicle-to-vehicle communications, etc. Furthermore, although the exemplary embodiment of FIG. 2 involves a wireless message containing a command to unlock the vehicle doors, the present method is not limited to such a message and could be used with numerous other types, including messages for texting or communication purposes. The following description is focused on the use of sequence counters to prevent replay-type attacks, and thus omits detailed discussions of other, known aspects regarding SMS messaging.

Beginning with step 102, call center 20 constructs an SMS message to send to vehicle 12 that instructs the vehicle to unlock its doors. The SMS message includes a payload section designed to contain a variety of contents, including a sequence counter and the command to unlock the vehicle doors. As skilled artisans will understand, the payload section can also include many other contents such as are already known in the art; thus, a detailed description of these known contents and items has been omitted here.

Next, step 104 retrieves and increments a sequence counter from a central data structure. The sequence counter is preferably maintained in a central data structure, such as database 84 or some other information storage entity, and is associated with a specific vehicle so that it can be incremented each time a message is sent to or received from that vehicle. According to one embodiment, call center 20 manages a fleet of vehicles—comprising anywhere from dozens to millions of vehicles—and maintains separate sequence counters for each vehicle. This one-to-many relationship is different than systems such as remote keyless entry (RKE) systems and remote garage door opener (RGDO) systems that operate on a one-to-one basis where two devices are paired to each other. One difference is that one-to-many relationships require a system to independently keep track of the various members of the group, where one-to-one relationships do not. To illustrate this sequence counter, which is hereinafter referred to as the call center sequence counter, consider the very first time that an SMS message is sent to vehicle 12 from call center 20. At this point, the call center sequence counter for vehicle 12 is set at '0' or some other starting value. Whenever a new message is sent to or received from vehicle 12, the call center sequence counter is incremented according to a predetermined step value. In this example, which involves a new message being sent to the vehicle, the sequence counter for vehicle 12 begins at '0' and is incremented to '1'.

The call center sequence counter for vehicle 12 is then inserted or added to the payload section of the outgoing SMS message, along with the other contents of the message, step 106. According to an exemplary embodiment, the call center sequence counter is an 8-bit counter (this provides for a total message count of 256), however, smaller and larger counters could be used as well. As mentioned above, it is expected that contents other than the call center sequence counter will be added to the payload section of the SMS message; these contents can include the actual message itself (in this case, an 8-bit command to unlock the vehicle doors) as well as various types of security features, to cite two possibilities. For a more detailed description of possible contents that could be added to the SMS message along with different encryption techniques that could be used with the present method, see U.S. application Ser. No. 11/837,775, filed Aug. 13, 2007, which is assigned to the present assignee and is incorporated herein by reference. Again, the present method is not limited to particular message contents, as it is primarily concerned with the use of sequence counters and can be used with various types of messages.

Now that the SMS message has been constructed, it is wirelessly sent from call center 20 to vehicle 12 over wireless carrier system 14, step 108. Transmission of the SMS message is likely to proceed through land network 16, SMSC 18, wireless communications system 14, or some combination thereof. Because methods for sending and delivering SMS messages are known in the art, a detailed description is not provided here. Once the SMS message is successfully received at vehicle 12, the vehicle can authenticate the message by using one of a variety of techniques. One of these techniques involves the extraction and evaluation of the call center sequence counter that was included in the payload section of the SMS message.

In step 110, a sequence counter maintained at the vehicle, hereafter referred to as the vehicle sequence counter, is retrieved and incremented in much the same fashion as was previously described. According to one embodiment, the vehicle sequence counter is stored in a data structure located in the vehicle, such as memory 24 or some other information storage entity, and is incremented each time a new message is sent to or received from the call center.

Once the vehicle sequence counter has been acquired, it can be compared to or evaluated against the call center sequence counter that was sent in the SMS message, step 112. If the two sequence counters have the same count (i.e. they are synchronized) then the present method assumes that the SMS message is not part of a replay-type attack and it allows for further processing of the message contents. To illustrate, assume that the call center and vehicle sequence counters are both synchronized and set to '5' when an unauthorized third party sniffs or intercepts a wireless message sent from the call center. If that message having a '5' in the sequence counter is received by the vehicle, then both the vehicle and the call center sequence counters will be incremented to '6'. When the unauthorized third party attempts to retransmit the intercepted message, step 112 will recognize that the embedded sequence counter does not match that of the vehicle sequence counter and will consider the message to be unauthentic. Accordingly, the sequence counters act as additional security features, above and beyond those inherent to the SMS protocol.

If the SMS messages is deemed to be authentic, then the door unlock command in the payload section of the SMS message is executed, step 114. As stated above, the SMS message does not have to contain a command to unlock the vehicle doors. Instead, it could include a command to perform some other function, it could include a text message for the vehicle occupants, or it could include a query seeking information from the vehicle, to name but a few possibilities. If the SMS message is found to be unauthentic, then the command in the SMS is ignored, step 116. Step 116 could simply delete the SMS message, quarantine the message for further analysis, send the message to some other entity for additional analysis, or dispose of it in some other fashion.

Figure 3:
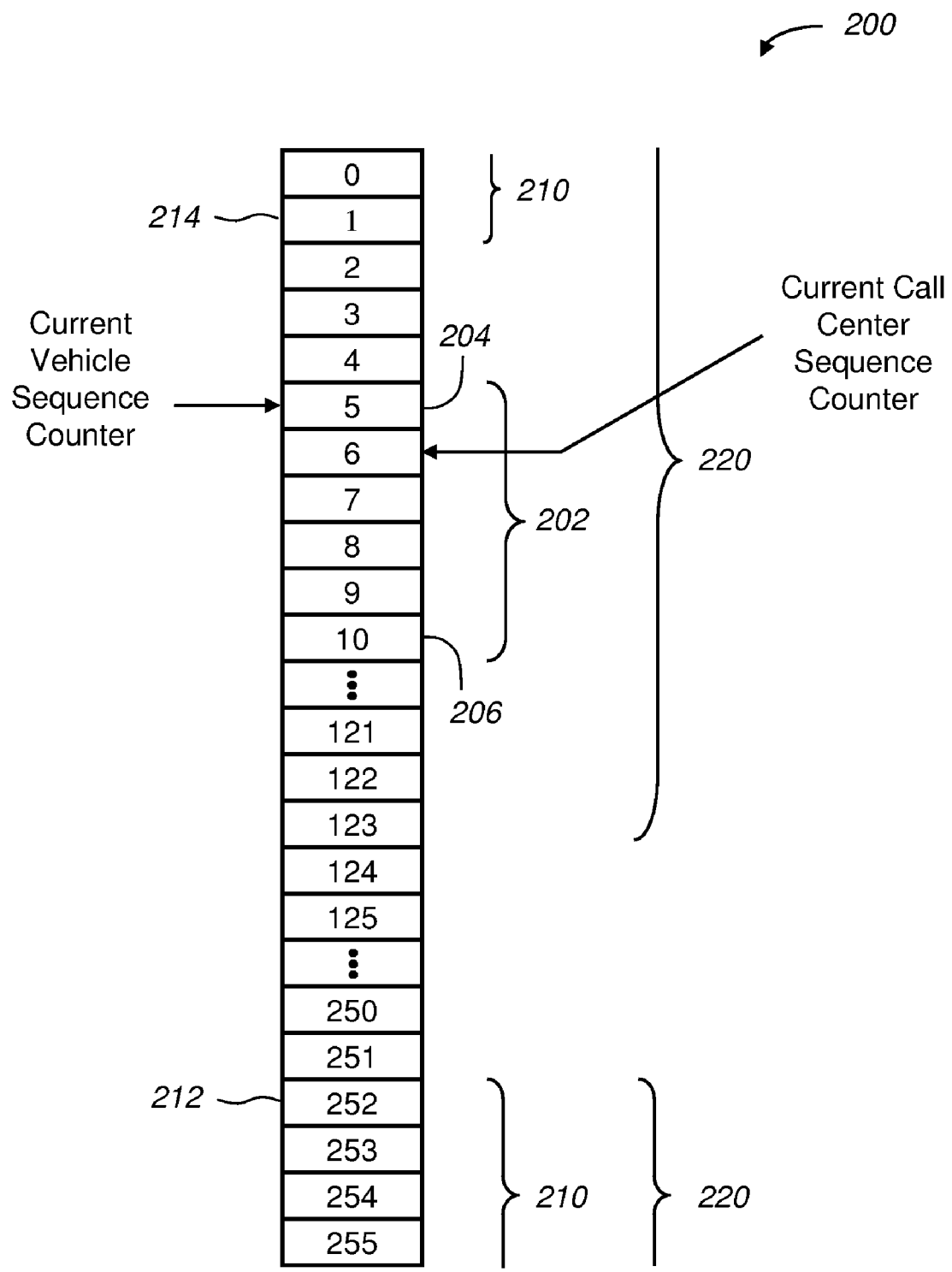
FIG. 3 is a schematic representation of a vehicle sequence counter that can be used with the present method.

There are a number of situations, however, where an SMS message gets lost or for some other reason does not reach its intended recipient. To address these types of situations, the present method can utilize one of several different features, including a tolerance window. With reference to FIG. 3, there is shown a depiction or representation of a vehicle sequence counter 200 that extends from '0' to '255' for a total of two hundred fifty-six counts (8-bit sequence counter). If, for example, the current vehicle sequence counter is at '5' and a tolerance window 202 having five counts is used, then the present method will accept an incoming SMS message having a call center sequence counter between '5'-'10', inclusive. This way, the method takes into account the fact that some SMS messages will get lost and avoids rejecting otherwise legitimate messages. Preferably, tolerance window 202 has a lower boundary 204 that is equal to the current vehicle sequence counter and an upper boundary 206 that is at least two counts higher or greater than the lower boundary.

To illustrate, assume that both the call center and vehicle sequence counters are at '5' when the call center sends an SMS message to the vehicle. If that SMS message is lost, the two sequence counters will become unsynchronized because the call center sequence counter will now be at '6' (it sent the SMS message but is unaware that it wasn't successfully received), but the vehicle sequence counter is still at '5'. If the next SMS message is successfully received by vehicle 12, the present method will recognize that the sequence counters are not the same, but it will accept the SMS message as authentic because the call center sequence counter has a value of '6' which is still within tolerance window 202. Of course, the specific value of the tolerance window 202 can vary from the example above and can be larger or smaller, so long as the tolerance window is greater than the vehicle sequence counter (besides situations where the counter flips over, which is addressed below, the tolerance window should not be less than the vehicle sequence counter). In the above-provided example, tolerance window 202 provides for five lost messages in a row before the call center sequence counter is out of the range of tolerance window 202.

Once an SMS message is received with a call center sequence counter that is within tolerance window 202, the vehicle sequence counter is reset or synchronized to the call center sequence counter. In the example above, where an SMS message having a sequence counter of '6' is received, the vehicle sequence counter would be reset to '6' so that it would equal to the current sequence counter. Without this synchronization process, a single lost message could result in the vehicle and sequence counters being permanently out of sequence.

According to another embodiment, the present method can use a consecutive message feature to accept two or more SMS messages that fall outside of the tolerance window, but are sent with consecutive call center sequence counters. Referring back to the example above, the call center and vehicle sequence counters are initially synchronized and both set to '5', and a tolerance window with five counts is used so that incoming messages with sequence counter values of between 5-10, inclusive, are accepted. If vehicle 12 happens to be in an area that has no cellular coverage and during that time call center 20 sends ten SMS messages to the vehicle that are not successfully received, the two sequence counters will become unsynchronized. The call center sequence counter would now be at '15', but the vehicle sequence counter is still at '5'. When the vehicle reenters an area with cellular service and receives the next SMS message from the call center, that message would contain a call center sequence counter of '16' and would not be accepted because it falls outside of tolerance window 202; this is despite the fact that it is a legitimate message from call center 20. However, according to one embodiment of the consecutive message feature, the vehicle keeps track of this message and compares it to the next message received at the vehicle to determine if they are in consecutive order and if they are greater than the current vehicle sequence counter (again, this excludes situations where the counter flips over, which is addressed below).

To elaborate, suppose the next SMS message received at the vehicle has a call center sequence counter value of '17'. The consecutive message feature compares that value to the previous call center sequence value of '16' and accepts these two SMS messages as legitimate because they are in consecutive order. Some of the reasoning behind the consecutive message feature is that in situations where the vehicle loses contact with the call center for some period of time, as described above, the call center sequence counter could advance beyond the tolerance window and there would be no mechanism for synchronizing the vehicle sequence counter to it. Moreover, in a replay-type attack the unauthorized third party typically retransmits a previously intercepted message without altering it. This type of attack would fail to satisfy the consecutive message requirements for at least two reasons. First, if the same message was retransmitted more than once, it would have the same sequence counter value, not consecutive values. Second, a previously intercepted message would likely have a counter value that is less than the current vehicle sequence counter, and would not be accepted on this basis (again, this ignores the issue of sequence counter flip over, as will be explained). It should be appreciated that the consecutive window could require two, three, four or more messages in a row, it could require a certain number of messages within a certain number of counts (e.g. two messages within three counts of each other) even if the numbers are not exactly consecutive, or it could have some other requirement. Once a message is deemed to satisfy the consecutive window requirements, the vehicle sequence counter should be synchronized once again with the call center sequence counter; this usually entails setting the vehicle sequence counter to the sequence counter of the most recently accepted SMS message.

The tolerance window and consecutive message features just described preferably require that an incoming SMS message have a sequence counter value that is greater than the current value of the vehicle sequence counter—this protects against the retransmission of old, intercepted messages with smaller sequence counter values. So long as the vehicle sequence counter is sufficiently large, there should not be an issue with this requirement. For example, if 24-bit sequence counters were used, they would have a range of '0'-'16,777,215'. It is unlikely that this sequence counter would flip over, as over sixteen million SMS messages would need to be sent to and/or from vehicle 12. However, the situation is different for 8-bit sequence counters, as proposed above, which only accommodate two hundred fifty-six SMS messages. This situation will first be described in the context of the tolerance window feature and then the consecutive message feature.

With reference back to FIG. 3, assume that the vehicle sequence counter has a current count of '252' with a tolerance window 210 of five counts. In this embodiment, the tolerance window feature would accept as authentic any incoming SMS message having a sequence counter of '252'-'1'; '252' acts as a lower boundary 212 and '1' acts as an upper boundary 214. Although it was previously stated that the tolerance window should cover counter values that are equal to or greater than the current vehicle sequence counter, a counter flip-over feature can be used to address this scenario. In this case, the flip-over feature would accept as legitimate SMS messages having call center sequence counter values of '0' or '1', even though they are less than the current vehicle sequence counter which is set at '252'.

The consecutive message feature confronts somewhat different challenges than the tolerance window and therefore addresses the counter flip-over scenario differently. Because counters flip over when they reach their upper limit, old messages intercepted by unauthorized third parties could actually have a higher counter value than the current vehicle sequence counter. In the tolerance window feature, this concern is abated somewhat by the fact that the counter still must be within a certain number of counts of the current vehicle sequence counter. However, the same is not true of the consecutive message feature, thus, the present method can employ another feature to act as an additional safeguard; a proximity feature. For those SMS messages that would satisfy the sequential message requirements but for the fact that their counter values are lower than the current vehicle sequential counter (because of the flip over), the proximity feature will accept the messages if they are within a certain proximity of the current vehicle sequence counter. Turning again to FIG. 3, assume that the current vehicle sequence counter is set at 252 and has a tolerance window 210 that extends from '252'-'1'. If two consecutive messages were received at the vehicle having counter values of '5' and '6', they would normally qualify as acceptable under the consecutive messages feature, but for the fact that they have counter values less than the current vehicle counter value of '252'. In this scenario, the proximity feature could be applied. In one embodiment, the proximity feature determines the entire range of the vehicle counter (in this case of vehicle sequence counter 200, there are a total of 256 counts) and takes some fraction of the range; say, for example, one-half of the range which is 128 counts. The proximity feature then determines if the SMS messages have counter values within the one-half range 220 (in this case, a one-half range of 128 counts results in a range of '252'-'123'. So, if an unauthorized third party recently intercepted two messages, say ones with sequence counter values of '250' and '251' and then retransmitted them to the vehicle, they would not be accepted. This is because they are less than the current vehicle sequence counter value of '252' and are not within a one-half proximity, as just explained.

Of course, the present method could utilize other techniques to authenticate or verify the validity of an incoming SMS message. For instance, the present method could also use some combination of short codes, originating addresses, encryption/decryption techniques, initialization vectors, as well as other methods known in the art. Again, some of these options are described in U.S. application Ser. No. 11/837,775, the entire contents of which are incorporated herein by reference.

It is to be understood that the foregoing description is not a definition of the invention, but is a description of one or more preferred exemplary embodiments of the invention. The invention is not limited to the particular embodiment(s) disclosed herein, but rather is defined solely by the claims below. For instance, the method described above could be used in communications that originate at the vehicle and are sent to the call center or some other entity, and they could be used with messages other than SMS messages, to cite a few possibilities. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of preventing replay-type attacks on a vehicle communications system, comprising the steps of:
   (a) maintaining a central data structure at a call center, wherein the central data structure includes a plurality of sequence counters associated with a plurality of vehicles, wherein the plurality of sequence counters includes a first sequence counter that is associated with a specific vehicle and is incremented each time a new message is sent to or received from the specific vehicle;

(b) maintaining a vehicle data structure at the specific vehicle, wherein the vehicle data structure includes a second sequence counter that is also associated with the specific vehicle and is incremented independently of the first sequence counter each time a new message is sent to or received from the call center;

(c) sending a wireless message between the call center and the specific vehicle, wherein the wireless message includes the first sequence counter if the wireless message is sent from the call center or the second sequence counter if the wireless message is sent from the specific vehicle; and (d) comparing the first sequence counter to the second sequence counter, wherein the comparison is used to prevent replay-type attacks by identifying wireless messages that were previously sent between the call center and the specific vehicle;

wherein step (d) further comprises comparing the first sequence counter to a sequence counter in a next message received to determine if the two sequence counters are in consecutive order; and wherein, if the two sequence counters are in consecutive order but are less than the second sequence counter, then the method further comprises the step of:

determining if the two consecutive sequence counters are within a certain proximity of the second sequence counter.

2. The method of claim 1, wherein the certain proximity is a predetermined fraction of the overall range of the second sequence counter.

* * * * *